United States Patent
Banks et al.

(10) Patent No.: US 11,465,156 B2
(45) Date of Patent: Oct. 11, 2022

(54) WASTE PROCESSING

(71) Applicant: FIBERIGHT LIMITED, Gwent (GB)

(72) Inventors: Charles Banks, Highfield (GB);
Nicholas Mark Thompson, Longtown (GB); Dhivya Jyoti Puri, Bassett (GB); Peter Speller, Llanishen (GB); Craig Stuart-Paul, Catonsville, MD (US)

(73) Assignee: FIBERIGHT LIMITED, Gwent (GB)

( * ) Notice: Subject to any disclaimer, the term of this patent is extended or adjusted under 35 U.S.C. 154(b) by 611 days.

(21) Appl. No.: 15/781,828

(22) PCT Filed: Dec. 8, 2016

(86) PCT No.: PCT/GB2016/053863
§ 371 (c)(1),
(2) Date: Jun. 6, 2018

(87) PCT Pub. No.: WO2017/098247
PCT Pub. Date: Jun. 15, 2017

(65) Prior Publication Data
US 2018/0361394 A1   Dec. 20, 2018

(30) Foreign Application Priority Data
Dec. 8, 2015   (GB) ...................... 1521624

(51) Int. Cl.
*D21B 1/02* (2006.01)
*B03B 9/06* (2006.01)
(Continued)

(52) U.S. Cl.
CPC ................. *B03B 9/06* (2013.01); *B09B 3/00* (2013.01); *B09B 3/80* (2022.01); *B09B 5/00* (2013.01);
(Continued)

(58) Field of Classification Search
CPC ........... B03B 9/06; B03B 3/00; B03B 3/0016; B29B 17/00; B29B 17/02; D21B 1/026; B21C 5/02
See application file for complete search history.

(56) References Cited

U.S. PATENT DOCUMENTS

| | | | |
|---|---|---|---|
| 3,935,150 | A | 1/1976 | Oxe et al. |
| 5,100,066 | A | 3/1992 | Frei |

(Continued)

FOREIGN PATENT DOCUMENTS

| | | |
|---|---|---|
| CN | 102327890 | 1/2012 |
| CN | 104690082 | 6/2015 |

(Continued)

OTHER PUBLICATIONS

Translation of Office Action dated Aug. 6, 2020 in Japanese Patent Application No. 2018-526945.

(Continued)

*Primary Examiner* — Jacob T Minskey
(74) *Attorney, Agent, or Firm* — Wenderoth, Lind & Ponack, L.L.P.

(57) ABSTRACT

The present invention relates generally to the field of waste processing. The method comprises separating waste into at least two parts, comprising: (i) mainly food waste (fines) and (ii) mainly paper and other recyclable material (overs). The overs are pulped and washed to obtain a cellulose-rich biomass and the fines are optionally processed separately to recover a cellulose-rich biomass and the cellulose-rich biomass from both the fines and the overs may be combined.

15 Claims, 1 Drawing Sheet

(51) Int. Cl.

| | |
|---|---|
| *C05F 9/00* | (2006.01) |
| *C10L 5/48* | (2006.01) |
| *B29B 17/02* | (2006.01) |
| *D21C 5/02* | (2006.01) |
| *B29B 17/00* | (2006.01) |
| *B09B 3/00* | (2022.01) |
| *B09B 5/00* | (2006.01) |
| *B09B 3/80* | (2022.01) |
| *C10L 5/36* | (2006.01) |
| *C10L 5/40* | (2006.01) |
| *C10L 5/46* | (2006.01) |

(52) U.S. Cl.
CPC .............. *B29B 17/00* (2013.01); *B29B 17/02* (2013.01); *C05F 9/00* (2013.01); *C10L 5/48* (2013.01); *D21B 1/026* (2013.01); *D21C 5/02* (2013.01); *C10L 5/363* (2013.01); *C10L 5/403* (2013.01); *C10L 5/46* (2013.01); *Y02E 50/10* (2013.01); *Y02E 50/30* (2013.01); *Y02W 30/20* (2015.05); *Y02W 30/40* (2015.05); *Y02W 30/52* (2015.05); *Y02W 30/62* (2015.05); *Y02W 30/64* (2015.05)

(56) References Cited

U.S. PATENT DOCUMENTS

| | | |
|---|---|---|
| 5,331,087 A | 7/1994 | Menges |
| 2006/0102299 A1* | 5/2006 | Elgarhy .................. D21C 5/02 162/5 |
| 2007/0231877 A1 | 10/2007 | Choate |
| 2011/0008865 A1* | 1/2011 | Lee ........................ C12M 45/20 435/166 |
| 2012/0190102 A1* | 7/2012 | Gitschel ................... C10L 3/08 435/267 |
| 2014/0366596 A1* | 12/2014 | Young ..................... C05F 17/70 71/8 |

FOREIGN PATENT DOCUMENTS

| | | |
|---|---|---|
| DE | 196 41 911 | 4/1998 |
| GB | 2 377 900 | 1/2003 |
| JP | 11-514281 | 12/1999 |
| JP | 2001-504382 | 4/2001 |
| JP | 2006-504524 | 2/2006 |
| JP | 2010-246421 | 11/2010 |
| WO | 96/27045 | 9/1996 |
| WO | 97/20643 | 6/1997 |
| WO | 03/025279 | 3/2003 |
| WO | 2004/041733 | 5/2004 |

OTHER PUBLICATIONS

International Search Report dated Apr. 7, 2017 in International (PCT) Application No. PCT/GB2016/053863.
Search Report dated May 27, 2016 in GB Application No. 1521624.5.
Examination Report dated May 21, 2021 in corresponding Aushian Patent Application No. 201636642.
Examination report dated Mar. 18, 2022 in corresponding Australian Patent Application No. 2016366642.
Australian Government, Department of Agriculture, Water and the Environment, 'National Waste Report 2013—National Organic Waste Profile' [retrieved from internet Mar. 15, 2022].

* cited by examiner

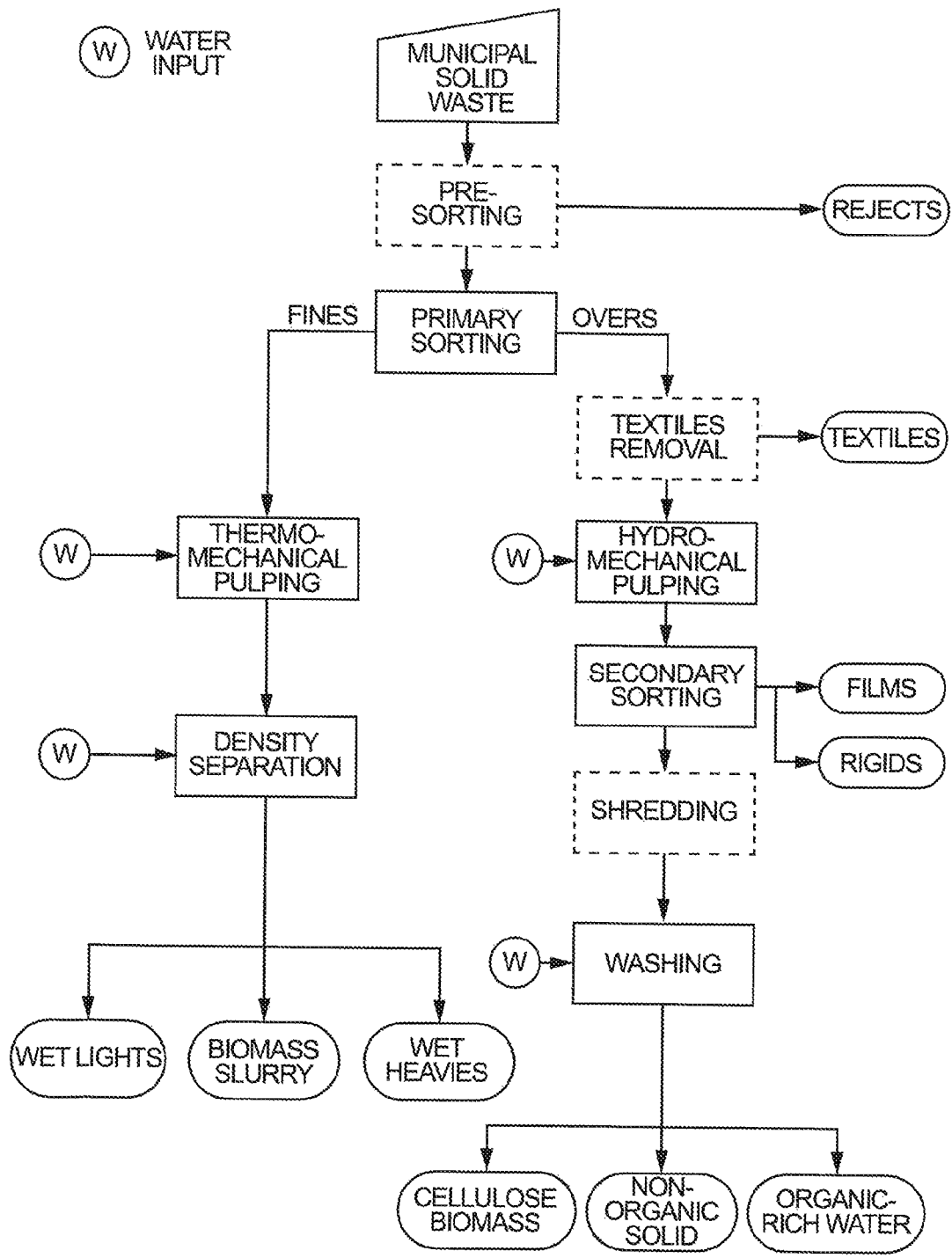

WASTE PROCESSING

The present invention relates generally to the field of waste processing. More specifically, the invention relates to methods for the efficient processing of waste matter, particularly general household, industrial and commercial waste, to recover a variety of recyclable materials and other useful products.

BACKGROUND

Commercial, industrial and residential consumers generate large amounts of waste, which requires handling and disposal in a safe and efficient manner. National and local governments in many parts of the world impose strict recycling requirements on households; nevertheless, a huge part of household waste is still sent to landfill or for incineration, thereby resulting in missed opportunities to obtain valuable products from the waste matter or to recycle the waste, rather than creating new products, which in turn contributes to the depletion of scarce resources. Furthermore, sending waste to landfill is not the best use of available land in a world with an ever-increasing population, with its growing demands for food and housing. Another problem associated with the use of landfill is the soil and water contamination it can cause. Incineration can cause air pollution and also does not make the best use of available land. Incineration also generates residues that ultimately end up in landfill.

Furthermore, although households in many parts of the world are required to separate household waste, for example, into: (i) non-recyclables, (ii) hazardous materials (such as batteries), (iii) food waste, (iv) garden waste and (v) recyclable materials (such as, paper, glass, plastics and metals), much of the separation at source is not done properly (and sometimes not at all) and so a significant sorting effort is still required at the Materials Recovery Facility (MRF) to remove any hazardous materials and to sort the waste into correct streams. However, many MRFs are not set up to deal efficiently with comingled or contaminated waste streams, resulting in MRFs rejecting a lot of incorrectly sorted waste. This can result in perfectly recyclable materials being sent to landfill or for incineration.

Various methods are available for the treatment and recovery of recyclable materials from general waste, but these processes are often inefficient, some to the extent that the input costs needed for recycling outweigh prices achievable for the recycled output, making recycling an unattractive or economically unviable option. There therefore remains a need for more efficient methods for the recovery of recyclable material and other useful products from general waste.

The present invention aims to solve the aforementioned problems by providing efficient and economically viable methods for waste processing to enable greater recovery of recyclable material and other useful products and/or to enable the recovery of cleaner end products.

SUMMARY OF THE INVENTION

The present invention provides a method for processing mixed waste, comprising the steps of:
  a) separating said waste into at least two parts, comprising: (i) mainly food waste (fines) and (ii) mainly paper and other recyclable material (overs);
  b) pulping said overs; and
  c) washing said pulped overs to obtain a cellulose-rich biomass; and optionally
  d) processing said fines to obtain a cellulose-rich biomass.

The present invention also provides a cellulose-rich biomass obtainable by the methods of the invention, which cellulose-rich biomass is cleaner (for example, through having a reduced ash content), than the cellulose biomass obtained by conventional waste processing methods, such as processes for (mixed) waste recycling and/or recovery. The yield of the cellulose-rich biomass obtainable by the methods of the invention is also greater than that obtainable by conventional waste processing processes, such as processes for (mixed) waste recycling and/or recovery.

The present invention also provides a hitherto unknown cellulose-rich biomass, comprising less than about 6% or less than about 7% or less than about 8% or less than about 9% or less than about 10% ash content (relative to the ash content of cellulose-rich biomass obtainable by conventional waste processing processes, such as processes for (mixed) waste recycling and/or recovery, such as paper and cardboard recycling) and a glucan:xylan ratio of between about 5-8:1.

The invention also provides various uses for the cellulose-rich biomass of the invention. The invention also provides various uses for other by-products of the methods of the invention.

DETAILED DESCRIPTION

According to the present invention, there is provided a method for processing mixed waste, comprising the steps of:
  a) separating said waste into at least two parts, comprising: (i) mainly food waste (fines) and (ii) mainly paper and other recyclable material (overs);
  b) pulping said overs; and
  c) washing said pulped overs to obtain a cellulose-rich biomass; and optionally
  c) processing said fines to obtain a cellulose-rich biomass.

The aforementioned process is not only a method for processing mixed waste, but is also a method for obtaining a cellulose-rich biomass, which process enables the recovery of a greater yield of cellulose-rich biomass and/or a cleaner cellulose-rich biomass than that obtainable by conventional waste processing processes, such as processes for (mixed) waste recycling and/or recovery.

The method according to the invention is suitable for the processing of mixed waste, preferably Municipal Solid Waste or MSW, i.e. the typical waste generated by households and commercial establishments, such as offices, schools, warehouses, restaurants, retail establishments, any non-hazardous industrial waste and residues from other waste recycling activities, such as MRF rejects. Typical MSW includes any of the following: paper, cardboard, plastics, metals, glass, batteries, appliances, textiles, rubber, wood, garden and food waste. The terms 'mixed waste', 'general waste', 'household waste', 'waste', 'Municipal Solid Waste' and 'MSW' are all used interchangeably herein to mean any two or more, three or more, four or more, five or more, six or more of the following: paper, cardboard, plastics, metals, batteries, appliances, glass, textiles, rubber, wood, garden and food waste.

Pre-Sorting

According to one embodiment of the invention, before the step of separating the fines from the overs (step (a) of the method), there is an optional 'pre-sorting' step in which the mixed waste is sorted to remove any hazardous items or items unsuitable for processing, such as items too large for downstream processing, masonry, furniture, electrical appliances, textiles, carpets and dead animals. The pre-sorting step serves to substantially remove any items which have little or no recycling value in the methods of the invention or which might damage equipment. The pre-sorting step may be carried out by manually picking out unsuitable items, either off the tipping floor or by placing the items on a moving belt and manually picking these items out and/or possibly with the aid of an optical sorter or the like.

Therefore, according to the methods of the invention, there is provided an optional pre-sorting step before step a) of separation of the fines from the overs. If there is no significant quantity of unsuitable items in the mixed waste, then no pre-sorting will be required before separation of the fines from the overs can begin.

Primary Sorting of MSW to Obtain Fines and Overs

The first step, step (a), in the method of the invention (if no pre-sorting step is needed) involves the separation of incoming MSW into 'fines' and 'overs'. Reference herein to 'fines' is taken to mean mainly food waste comprising other minor components, such as glass, grit, plastics and paper. Reference herein to 'overs' is taken to mean waste comprising mainly plastics, metal, paper and cardboard.

The separation of the fines from the overs may be done by passing the incoming waste through a trommel or the like (i.e. any type of screen or other apparatus which allows for separation of material by size). One or more trommels or the like may be used depending on, for example, the nature and size of the incoming waste. For example, the overs may be passed through a first trommel or other screen or apparatus having a screen size of between about 300-500 mm and then through another trommel having, for example, a screen size of between about 50-150 mm. Alternatively, any screening, set up or arrangement for processing aggregate which allows fines to be obtained with a diameter of less than about 200 mm may be used in the methods of the invention.

In conventional waste recovery processes, there is often no separation of the fines from the overs; or, if there is such separation, the fines are typically composted or used in anaerobic digestion and it is only the overs which are processed further. However, these untreated, contaminated fines can be problematic as they are only suitable (after appropriate stabilization) for spreading on brownfield sites. Advantageously, according to the methods of the invention, the separation of the fines from the overs and their separate processing enables the recovery of recyclable materials to be maximised and a greater yield of cellulose-rich biomass and other useful products to be obtained from MSW, whilst minimising the amount of waste sent to landfill or for incineration.

Processing of the Overs

It is preferable to remove any textiles which may be present in the overs stream before processing of the overs begins; this may be in addition to or instead of any textile removal at the pre-sorting step. Textiles can be particularly problematic as they have a tendency to get caught in machinery or to wrap themselves around machine parts and the other materials to be recycled. This can damage equipment and hinder the efficient recycling of other products. The processing of overs involves the addition of water and, with textiles being such absorbent materials, removal of the majority of textiles before the overs are processed allows for water and fuel savings to be made, thereby adding to the overall efficiency of the process.

The textiles may be removed by placing the overs on, for example, a moving belt and picking out any textiles manually or with the aid of an optical sorter or the like. The recovered textiles may then be recycled separately.

Therefore, according to the methods of the invention, there is provided an optional step for removal of textiles from the overs before pulping of the overs in step b) begins.

According to an alternative embodiment of the invention, the unprocessed fines may be combined with the substantially textile-free overs for combined processing of the fines and overs.

The substantially textile-free overs comprise a mixture of paper, cardboard, plastic film, plastic containers and metal containers, all contaminated with food waste and other minor contaminants. The first step in the processing ('pulping') of the substantially textile-free overs (optionally together with the unprocessed fines) involves the disintegration of the paper and cardboard components of the overs to produce a pulp. Once the cardboard and paper is pulped, recyclable materials, such as plastic film, plastic and metal containers may be more easily recovered. The processing of the overs therefore comprises breaking down (or 'pulping') of the overs to obtain at least three parts, comprising: (i) a pulp (also referred to herein as a 'biomass pulp'), preferably having a paper mâché-type consistency; (ii) other recyclables; and (iii) dirty wash water.

The processing of the overs may be carried out by any means and using any apparatus which allows for the breaking down or pulping of the overs to obtain at least three parts, comprising: (i) a pulp; (ii) other recyclables; and (iii) dirty wash water.

Advantageously, each of the three aforementioned components may be of direct use or may be of indirect use in the generation of further products. For example, the pulp may be washed (see below) to recover a cellulose-rich biomass, which may be used in enzyme hydrolysis and subsequently used for biogas production or in a variety of other end uses. The recyclables may be recycled and reused. The dirty wash water may, for example, be returned and reused in other parts of the process or may be used in anaerobic digestion for biogas production or may be directed to the washing tunnel to increase recoverable cellulose and ultimate biogas yield.

The overs may be processed in any apparatus which allows for the break down of the overs to give at least three parts, comprising: (i) a pulp; (ii) other recyclables and dirty wash water. Examples of such apparatus include a drum pulper or other suitable pulper, autoclave, rotating drum or the like or any other apparatus which allows for the breakdown of the overs to obtain a biomass pulp so as to allow for recovery of the other recyclables and dirty wash water.

For example, the processing, breaking down or pulping of the overs may be through any of the following actions or a combination thereof: hydro-mechanical, thermo-mechanical and hydrothermal. The terms 'hydro-mechanical', 'thermo-mechanical', 'hydrothermal' are as defined herein, but particularly with reference to the overs means any apparatus or combination of apparatus which use water-based and/or heat-based action and/or mechanical-based action to result in a biomass pulp, preferably having a paper mâché-type consistency (allowing for recovery of the other recyclables and dirty wash water).

The terms 'processing', 'breaking down' and 'pulping' are as defined herein and again, particularly with reference to the overs, mean the conversion of at least a part of the overs (as defined herein) into a biomass pulp, preferably having a paper mâché-type consistency (allowing for recovery of the other recyclables and dirty wash water).

Step b) of the method of the invention: 'pulping of the overs', therefore comprises pulping of the overs to obtain at least three parts, comprising: (i) a pulp; (ii) other recyclables and dirty wash water.

The substantially textile-free overs may be introduced into a first part of a drum pulper (or any other apparatus suitable for breaking down of the overs) where water, preferably ranging in temperature from ambient up to about 130° C. (for example, in the range of about 20° C. to about 25° C.; or in the range of about 25° C. to about 30° C.; or in the range of about 30° C. to about 35° C.; or in the range of about 35° C. to about 40° C.; or in the range of about 40° C. to about 45° C.; or in the range of about 45° C. to about 50° C.; or in the range of about 50° C. to about 55° C.; or in the range of about 55° C. to about 60° C.; or in the range of about 60° C. to about 65° C.; or in the range of about 65° C. to about 70° C.; or in the range of about 70° C. to about 75° C.; or in the range of about 75° C. to about 80° C.; or in the range of about 80° C. to about 85° C.; or in the range of about 85° C. to about 90° C.; or in the range of about 90° C. to about 95° C.; or in the range of about 95° C. to about 100° C.; or in the range of about 105° C. to about 110° C.; in the range of about 110° C. to about 115° C.; or in the range of about 115° C. to about 120° C.; in the range of about 120° C. to about 125° C.; or in the range of about 125° C. to about 130° C.), is added to the drum and/or to the overs, in an amount ranging preferably from between about 0-250%/weight of the overs (for example, about 0%, up to about 50%, up to about 100%, up to about 150%, up to about 200%, up to about 250%/weight of the overs). The water temperatures and volumes of water used may be adjusted depending on the particular composition of the overs and this effective management of water and heat/fuel consumption will contribute to the overall efficiency of the process. The material in the drum pulper or other suitable apparatus may then be moved along to a second part of the drum or other apparatus, which acts like a trommel, separating out the recyclables such as plastic film and containers from the biomass pulp component. The biomass pulp component may be further screened and separated by size before processing further.

Advantageously, the method of the invention is practiced in a continuous batch fashion, meaning that as one load of material is moved from the first part of the drum pulper to the second (or moved along other suitable apparatus), a new load replaces it so that a steady stream of substantially textile-free overs is continuously processed.

According to an alternative embodiment of the invention, instead of using a drum pulper, the substantially textile-free overs may be processed by pulping in an autoclave, for example, followed by passing the material through a screen or trommel to separate the pulp biomass from any recyclable material. However, this process has the disadvantage of being a batch process, rather than continuous, making it less efficient due to increased energy and manpower demands.

Secondary or Further Sorting of the Pulped Overs

As described above, the step of pulping of the overs (step b)) results in at least three parts, comprising: (i) a pulp, preferably having a paper mâché-type consistency; (ii) other recyclables (typically recovered from any un-pulped material); and (iii) dirty wash water.

Following pulping, recyclable materials (component (ii) 'other recyclables') are removed from the material coming out of the drum pulper or other suitable apparatus. These recyclable materials are typically recovered from any un-pulped material. Removal of any plastic film and containers at this point frees up capacity in the downstream equipment, making for a more energy-efficient process due to energy resources being spent only where needed. Furthermore, removing any plastic film at this point allows for the better and cleaner recovery of the rigid recyclable materials, such as rigid plastic containers and metal containers (both ferrous and non-ferrous). The plastic film may be removed by passing the pulped overs (the output from the pulper or other apparatus) through a vacuum drum separator or the like which lifts and removes the light-weight film, leaving behind the heavier containers. The plastic film may alternatively be removed on a moving belt manually and/or with the aid of a vacuum device and air classification.

Recyclable materials such as containers may be sorted using an automated optical sorting device, which can separate rigid containers according to polymer type. Overband magnets may be used for the separation and recovery of steel and other ferrous containers and eddy current separators may be used for the separation and recovery of aluminium or other non-ferrous containers.

Any un-pulped material, for example, paper or cardboard, found amongst the recyclable material at this stage may be manually or automatically picked out and returned to the substantially textile-free overs feed for (re)pulping. Any residual debris (i.e. anything which is neither a pulp nor a recyclable nor dirty washwater) may be rejected at this stage and disposed of in landfill. Advantageously, any such residual debris requiring disposing of in landfill is reduced compared to that of conventional processes for recycling waste.

Following removal of the recyclable materials from the pulped overs, an optional shredding step may be employed. This involves shredding any un-pulped material from the processed overs, minus the recyclable materials, in a conventional shredder, and optionally returning the shredded mixture to the pulper or other apparatus so as to maximize recovery of useful products therefrom. The shredded or comminuted material may be added to the fines and/or overs for re-pulping. The shredding step allows items enclosed in plastic bags (such as nappies or other sanitary products), which might otherwise not be properly accessible for pulping, to become more available for pulping. Advantageously the shredding increases the surface area of the material to be processed, which in turn maximizes eventual yields of valuable materials, such as pulp (and cellulose therefrom).

Therefore, according to the methods of the invention, there is provided an optional step of shredding all or part of the output (pulped overs, un-pulped overs, recyclables etc.), preferably just the un-pulped overs, following pulping step b) and before washing step c). Optionally, the shredded overs are re-pulped before washing step c).

In contrast to the methods of the invention, conventional waste processing methods may employ dry sorting to separate recyclables, such as plastic film and containers, from paper and cardboard, but this requires extra manpower and recovers unwashed, contaminated recyclable material. Advantageously, the plastic film and containers and other recyclable material recovered from the processed overs (whether pulped or un-pulped) produced by the methods of the invention are relatively clean and in better condition for further recycling or reuse. Cellulose recovery is also thereby increased compared to conventional waste processing processes and may be even further increased by removing labels from cans and bottles, separation of tetra-pack and plastic-lined coffee cups, a step which is not carried out in conventional MFRs.

Washing of the Pulped Overs

The pulped overs (specifically the 'pulp', which is substantially free of plastic film, plastic and metal containers and other recyclable materials) are then washed. The washing process aims to remove any food waste, water soluble organic and inorganic contaminants and any other solid debris from the biomass pulp so as to provide cleaner end products, particularly cellulose-rich biomass, than can be obtained by conventional processes, such as at a MRF and through MBT (mechanical biological treatment). Conventional surfactants (including bio-derived surfactants) and/or enzymes and/or catalysts and/or additives and/or any other suitable agents may also be used in the washing process to optimize washing and to obtain an even cleaner end product.

The pulped overs (specifically the 'pulp' component) may travel along a moving belt to a washing system to allow the process to operate in an automated manner with minimal man power. Weighing belts may also be used to control the rate and amount of the pulped overs (pulp) fed into the washing system. The washing system is advantageously a continuous batch process, meaning that as one load of material is moved along the washing system, a new load replaces it, so that a steady stream of pulped material is continuously fed into the system.

The washing system may include conventional equipment for the washing of a biomass pulp, optionally with mechanical dewatering (for example using a filter press or centrifuge), if necessary.

The washing system may involve washing of pulped overs (principally the pulp component) in a rotating wash trommel or tunnel or the like. The wash trommel serves to clean the material and to separate the material according to size. Preferably, the material is separated into at least two fractions: one fraction that is greater than about 10 mm in diameter and another that is less than about 10 mm in diameter. The smaller fraction may be washed, dewatered and processed further to recover organic matter, such as cellulose. Any sand, grit or gravel in either the smaller or larger fraction may be recovered and recycled as aggregate. The dirty wash water may be processed to remove silt, with the aid of filters, coagulants, flocculants or the like. The dirty wash water, following removal of any silt or other particulate matter, may then be reused in other parts of the process.

According to an alternative embodiment of the invention, the washing system may comprise washing of the pulped overs (specifically the 'pulp' component) in a washing tunnel. The washing tunnel may comprise a plurality of baskets or compartments arranged in a row (or any other suitable configuration). One or more of the baskets may contain a sump and may be arranged to rock from side to side to aid the washing process and the further breakdown of the material through agitation of its contents. The internal surface of some or all of the baskets may contain a grooved surface or the like to aid agitation and cleaning of the contents. One or more of the baskets may also be arranged to rotate so that the contents of one basket may be tipped into another basket. One or more of the baskets may contain holes or perforations to allow the escape of water and/or pulp and/or contaminants into the washing tunnel, depending on requirements. For example, one or more baskets may be arranged to allow for the removal of larger pieces (approximately >10 mm) of non-cellulosic material (such as plastic, glass and food waste) from the pulp. This may be achieved by having baskets with relatively large holes, which baskets are arranged to rock from side to side in a cross flow current of water, enabling pulp to flow out through the holes into the water, whilst larger contaminants are retained within the basket. One or more baskets may be arranged to allow for 'dewatering' so that contaminated water may be removed, which may be achieved by having the basket(s) rock from side to side to promote draining of contaminated water and retention of washed pulp.

The baskets may be controlled to rock or to rotate at predetermined intervals. The baskets may be arranged to rotate in a single direction (unidirectional) or back and forth (bidirectional or oscillating).

The washing tunnel may comprise at least 2 baskets or 3, 4, 5, 6, 7, 8, 9, 10, 11, 12, 13, 14, 15 or more. Furthermore, different baskets in the washing tunnel may be involved in different aspects of the washing process. For example, one or more baskets may be dedicated to washing (these baskets are said to be in the 'washing zone' of the washing tunnel). One or more baskets may be dedicated to dewatering (which baskets are said to be in the 'dewatering zone' of the washing tunnel). One or more baskets may be dedicated to extraction (which baskets are said to be in the 'extraction zone' of the washing tunnel).

For reasons of efficiency and economy, clean water is not introduced into every basket and dirty water coming from one basket, for example, from the dewatering or extraction zone, may be recycled in another appropriate basket, for example, in the washing zone, or in another part of the overall process.

Advantageously, the methods of the invention minimises water use, which in turn reduces operating costs and the costs of having to treat any residual contaminated water. The water savings are made through the use of a counterflow of water from the 'clean' end of the wash system to the 'dirty' end of the wash system or the recycling of water within the process as a whole.

The washing system (whether a rotating wash trommel, a washing tunnel or other washing system), may employ a glass settling tank and/or a grit hydrocyclone to remove small pieces (approximately <10 mm) of non-cellulosic material (plastic, glass, dense particulates and food waste) or non-organic material from the pulp, wherein 'organic' as referred to herein means any plant or animal-derived material having a carbon basis. Glass and grit can be a particular problem as they can erode rotating equipment. In the settling tank, gravity causes hard and/or dense particulates (up to about 5 mm in diameter) in the pulp to settle at the bottom of the tank. The hydrocyclone uses centrifugal force to separate hard and/or dense particulates greater than about 1 mm in diameter and of a density greater than water from the pulp. The hard and/or dense particulates removed may be recycled as aggregate.

Following removal of grit and other dense and/or hard particulates in the settling tank and/or hydrocyclone, the grit-free pulp may require dewatering to remove any potentially contaminated water. This may be achieved through the use of a pulp thickener and dewatering press, such as a side hill screen and/or a stock screw press. The dewatering press (for example, the side hill screen) improves the consistency of the pulp following treatment in the hydrocyclone, making it more suitable for the screw press.

Advantageously, there are at least two useful end products resulting from the washing step (specifically washing of the pulp): (i) a cellulose-rich biomass; and (ii) a non-organic substantially solid stream. The washing process also results in a useful organic-rich waste water stream, which may be recycled (optionally after treatment, such as biological treatment) before being recycled in the main process, for example in the pulping of the overs.

Advantageously, the 'clean' cellulose-rich biomass obtainable by the methods of the invention makes it better suited for enzyme hydrolysis, conversion to synthesis gas (syngas) and other uses such as paper making, pulp moulding, cellulose insulation, horticultural products & peat substitutes, SMA fibres and viscosity modifiers, than the 'dirtier' cellulose obtainable by conventional mixed waste treatment processes.

Advantageously, the non-organic substantially solid stream, which comprises mainly plastics, metals and small textiles, approximately >20 mm in diameter, or >15 mm in diameter, or >10 mm in diameter or >5 mm in diameter or >1 mm in diameter, may be used for further recovery of recyclable materials before thermal combustion or for conversion to syngas, for the production of energy, which may advantageously also be used to supply heat and energy for the process.

Processing of the Fines

The fines obtained following primary sorting are processed in a different manner to the overs. The fines contain mainly food waste, glass and grit. The glass and grit can damage equipment and therefore need safe and efficient removal from the fines, whilst maximising recovery of useful products, such as cellulose pulp.

The fines are processed by thermo-mechanical pulping in an autoclave at temperatures of between about 70° C.-130° C., 80° C.-130° C., 90° C.-130° C., 100° C.-130° C. or 100° C.-125° C. for between about 15-60 minutes. Water may optionally be added to the fines in an amount ranging from between about 0-100%/weight of the fines. According to one embodiment of the invention, the temperature may be about 70° C. or about 75° C. or about 80° C. or about 85° C. or about 90° C. or about 95° C. or about 100° C. or about 105° C. or about 110° C. or about 115° C. or about 120° C. or about 125° C. or about 130° C. or more. The fines may be thermo-mechanically pulped for about 15 minutes or about 20 minutes or about 25 minutes or about 30 minutes or about 35 minutes or about 40 minutes or about 45 minutes or about 50 minutes or about 55 minutes or about 60 minutes or more. Water may optionally be added to the fines to be thermo-mechanically pulped in a quantity of about 10%/weight of the fines or about 20%/weight of the fines or about 30%/weight of the fines or about 40%/weight of the fines or about 50%/weight of the fines or about 60%/weight of the fines or about 70%/weight of the fines or about 80%/weight of the fines or about 90%/weight of the fines or about 100%/weight of the fines or more.

Advantageously, the aforementioned temperature, time and water content parameters ensure adequate breakdown and substantial sterilization of food matter, whilst avoiding the shrinking or melting of any plastics material, thereby avoiding damage to equipment and sub-optimal recovery of useful products. The thermo-mechanical pulping, for example, contributes to avoiding production of potentially harmful volatile organics, thereby avoiding the costs associated with hiring specialist staff and having to conduct the process using specialist equipment and additional safety measures. The thermo-mechanical pulping of the fines as defined herein also allows for a better yield of organic matter, such as cellulose. The temperature range and/or water addition advantageously contributes to avoiding plastics shrinkage or melting.

The exact temperature, water quantity and time parameters are not essential, but may vary depending on the nature of the fines (water content, plastics content etc.), autoclave equipment and quantity of materials to be processed. The skilled person will readily be able to adjust the temperature, water and time accordingly so as to ensure adequate breakdown of food waste, without the substantial melting of any plastics present in the fines.

The pulped fines (following processing by thermo-mechanical pulping) are then separated according to density into at least three streams comprising:
  (i) a 'wet heavies' fraction, comprising substantially all the glass and grit present in the pulped fines;
  (ii) a 'wet lights' fraction, comprising substantially all the plastics, wood and other materials able to float on water present in the pulped fines; and
  (iii) a slurry comprising a cellulose-rich biomass and water-soluble organic compounds.

The present invention provides a method for the processing of fines (comprising mainly food waste, preferably having a diameter of less than about 200 mm), comprising the steps of thermo-mechanical pulping followed by density separation. The processing of the fines advantageously results in recovery of the at least three streams mentioned above. Further recoverable is an organic-rich wash water, which may be used for biogas production or which may be recycled in the process.

All or part of the 'wet heavies' fraction may be recycled as aggregate.

The 'wet lights' fraction may be returned to washing step c) of the processing of the overs or it may be diverted elsewhere in the process to meet water demands.

The water-soluble organic compounds present in the slurry may be used in anaerobic digestion for biogas production or may be directed to the washing tunnel to increase recoverable cellulose and ultimate biogas yield.

The cellulose-rich biomass present in the slurry may be recovered for use in enzyme hydrolysis and subsequently used for biogas production or in a variety of other end uses such as those applicable to the cellulose-rich biomass obtainable from the processing of the overs.

According to another aspect of the present invention, there is provided a pulp and/or a cellulose-rich biomass obtainable (from the fines and/or overs) by the methods of the invention.

According to another aspect of the present invention, there is provided recyclables (cleaner recyclables) obtainable by the methods of the invention.

According to another aspect of the present invention, there is provided a non-organic substantially solid stream obtainable by the methods of the invention.

According to another aspect of the present invention, there is provided an organic-rich wash water or dirty wash water obtainable (from the processing of the fines and/or overs) by the methods of the invention.

According to another aspect of the invention, there is provided a cellulose-rich biomass, comprising less than about 6% or less than about 7% or less than about 8% or less than about 9% or less than about 10% ash and a glucan:xylan ratio of between about 5-8:1 (for example, about 5:1, about 6:1, about 7:1, about 8:1) relative to cellulose-rich biomass obtainable by conventional mixed waste recycling processes.

A cellulose-rich biomass derived from mixed waste, office paper, cardboard or newspaper would typically have a higher ash content than the cellulose-rich biomass of the invention. A lower ash content may be advantageous as it allows for easier processing in, for example, enzyme hydrolysis, biogas production etc. and may also be useful as a peat moss replacement.

Furthermore, the composition of the fibres in the cellulose-rich biomass of the invention differs from the fibres of biomass derived from agricultural waste. For example, the cellulose-rich biomass of the invention has a lower hemicellulose content (less than about 30% or 20% or 10%) compared to, for example, cellulose obtained from agricultural and forestry waste. The cellulose-rich biomass of the invention also has a lower xylan content compared to that present in a cellulose-rich biomass obtained from the forestry or agricultural waste. A lower xylan content may confer advantages due to the different xylan:cellulose ratio for applications where a higher cellulose content is considered beneficial. The cellulose-rich biomass of the invention also has a lower lignin content compared to that present in a cellulose-rich biomass obtained from forestry or agricultural waste.

According to another aspect of the present invention, there is provided use of a non-organic substantially solid stream obtainable from a waste processing process according to the present invention in thermal combustion or for conversion to synthesis gas (syngas). The non-organic substantially solid stream comprises mainly plastics, metals and textile, for example, approximately >20 mm in diameter.

Preferred features of the second and third aspects of the invention may be as described above in connection with the first aspect.

Throughout the description and claims of this specification, the words "comprise" and "contain" and variations of the words, for example "comprising" and "comprises", mean "including but not limited to", and do not exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Other features of the present invention will become apparent from the following example. Generally speaking the invention extends to any novel one, or any novel combination, of the features disclosed in this specification (including any accompanying claims and drawings). Thus features, integers, characteristics, compounds, chemical moieties or groups described in conjunction with a particular aspect, embodiment or example of the invention are to be understood to be applicable to any other aspect, embodiment or example described herein unless incompatible therewith.

Moreover unless stated otherwise, any feature disclosed herein may be replaced by an alternative feature serving the same or a similar purpose.

FIGURES

The present invention will now be described by way of example only and with reference to the accompanying illustrative drawing in which FIG. 1 shows a process according to the present invention for the processing of MSW, which may comprise any of the following: paper, cardboard, plastics, metals, glass, batteries, appliances, textiles, rubber, wood, garden and food waste.

The incoming MSW is shown to undergo an optional (shown with dashed lines) PRE-SORTING step in which any hazardous items or items unsuitable for processing, such as items too large for downstream processing, masonry, furniture, electrical appliances, textiles, carpets and dead animals are removed (REJECTS).

Following optional PRE-SORTING, the MSW undergoes PRIMARY SORTING, which involves passing the MSW through at least one trommel or other screen (not shown) which separates the material into FINES (comprising mainly food waste with other minor components, such as glass, grit, plastics and paper) and OVERS (comprising mainly plastics, metal, paper and cardboard). The trommel(s) or screen(s) allows for separation of material to allow fines with a diameter of less than about 200 mm to be obtained.

The OVERS then undergo an optional (again shown with dashed lines) TEXTILE REMOVAL step. Any TEXTILES recovered are recycled separately.

The substantially textile-free OVERS are then shown to undergo HYDRO-MECHANICAL PULPING with the addition of water (W). The HYDRO-MECHANICAL PULPING may be carried out in a drum pulper (not shown). The pulped material then undergoes a SECONDARY SORTING step, during which plastic film (FILMS), plastic and metal containers (RIGIDS) are removed. The FILMS may be removed by passing the pulped overs through a vacuum drum separator (not shown) or the like which lifts and removes the light-weight FILMS, leaving behind the heavier containers (RIGIDS). The FILMS may alternatively be removed on a moving belt with the aid of a vacuum device (not shown). The RIGIDS may be sorted using an automated optical sorting device (not shown), which can separate rigid containers according to polymer type. Overband magnets may be used for the separation and recovery of steel and other ferrous containers and eddy current separators may be used for the separation and recovery of aluminium or other non-ferrous containers. The recovered FILMS and RIGIDS may then be baled for further recycling or reuse. Any un-pulped paper or cardboard found amongst the recyclable material at this stage may be manually or automatically picked out and reintroduced to THERMO-MECHANICAL PULPING.

Following SECONDARY SORTING, there is an optional (denoted with dashed lines) SHREDDING step. This involves shredding the un-pulped overs (after recyclate recovery), minus the FILMS and RIGIDS, in a conventional shredder (not shown), and optionally returning the shredding mixture to the pulper so as to maximize recovery of useful products therefrom.

Following SHREDDING or following SECONDARY SORTING, there is a WASHING step for the removal of any food waste, water soluble organic and inorganic contaminants and any other solid debris from the biomass pulp. Conventional surfactants, including bio-derived surfactants, and/or enzymes and/or catalysts and/or additives and/or any other suitable agents may also be used in the washing process to optimize the washing process and to obtain an even cleaner end product.

The WASHING may include conventional equipment for the washing of a biomass pulp, optionally with mechanical dewatering (for example using a filter press or centrifuge), if necessary. Alternatively, the WASHING step may involve washing of pulped overs in a rotating wash trommel or the like, which cleans the material and separates according to size. Alternatively WASHING may comprise washing of the pulped overs in a washing tunnel.

Following WASHING of the OVERS, three main products are obtained: (i) CELLULOSE-BIOMASS, (ii) NON-ORGANIC SOLID, and (iii) ORGANIC-RICH WATER.

The left-hand side of FIG. 1 shows the processing of the FINES which undergo THERMO-MECHANICAL PULPING, with the optional addition of water (W). The pulped FINES then undergo a DENSITY SEPARATION step which results in three main products: (i) WET LIGHTS, (ii) BIOMASS SLURRY and (iii) WET HEAVIES.

FIG. 1 shows the processing of the FINES and the OVERS in one process, however, these may be separately performed.

DEFINITIONS

The following definitions are used throughout the present application. The section captions and headings in this application are for convenience and reference purpose only and should not affect in any way the meaning or interpretation of this application. The technical terms and expressions used within the scope of this application are generally to be given the meaning commonly applied.

Municipal Solid Waste, MSW, Mixed Waste, General Waste, Household Waste, Waste 'Municipal Solid Waste' or 'MSW' is the typical waste generated by households and commercial establishments, such as offices, schools, warehouses, restaurants, retail establishments, any non-hazardous industrial waste and residues from other waste recycling activities, such as MRF rejects. Typical MSW includes any of the following: paper, cardboard, plastics, metals, glass, batteries, appliances, textiles, rubber, wood, garden and food waste. The terms 'mixed waste', 'general waste', 'household waste', 'waste', 'Municipal Solid Waste' and 'MSW' are all used interchangeably herein to mean any two or more, three or more, four or more, five or more, six or more of the following: paper, cardboard, plastics, metals, batteries, appliances, glass, textiles, rubber, wood, garden and food waste.

Fines

Reference herein to 'fines' is taken to mean mainly food waste comprising other minor components, such as glass, grit, plastics and paper.

Overs

Reference herein to 'overs' is taken to mean waste comprising mainly plastics, metal, paper and cardboard.

Trommel

Reference herein to a 'trommel' is taken to mean a screen used to separate material according to size. Trommels are typically cylindrical, perforated and capable of rotating, allowing undersized material to pass through the perforations.

Hydro-Mechanical, Thermo-mechanical, Hydrothermal,

Reference to 'hydro-mechanical', 'thermo-mechanical', 'hydrothermal' means or apparatus, as used herein, means any force(s) or apparatus or combination of apparatus using water (hydro-) and/or heat (thermo-) and/or mechanical-based action to breakdown waste, fines or overs.

Breakdown, Processing, Pulping

The terms 'breakdown', 'breaking down', 'pulping', 'processing', are all (sometimes depending on the context), used interchangeably herein to mean, for example, in the case of the 'overs' any action which results in the disintegration and conversion of waste to at least a biomass pulp.

Biomass Pulp, Pulp, Cellulose Pulp, Cellulose-rich Biomass, Cellulose

The terms 'biomass pulp' and 'pulp' are used interchangeably herein to mean the resultant product from the breakdown of waste (typically comprising paper, cardboard and plant-based components) to produce a pulp having a paper mâché-type consistency and before the washing step. After the washing step, a 'cellulose pulp', 'cellulose-rich biomass' or 'cellulose' is obtained, which terms are used interchangeably herein to mean the resultant product following washing of the biomass pulp.

Organic, Non-Organic

The term 'organic' as referred to herein means any plant or animal-derived material having a carbon basis, but excluding plastics; the term 'non-organic' therefore refers to anything which is not organic and includes plastics.

The invention claimed is:

1. A method for processing Municipal Solid Waste (MSW), comprising the steps of:
   a) separating said waste into at least two parts, comprising: (i) fines comprising mainly food waste and (ii) overs comprising mainly paper and other recyclable material;
   b) pulping said overs; and
   c) washing said pulped overs to obtain a first cellulose-rich biomass; and
   d) processing said fines by thermomechanical pulping followed by density separation to obtain a second cellulose-rich biomass,
   wherein said first and second cellulose-rich biomass combined comprises less than about 10% ash and a glucan:xylan ratio of between about 5-8:1.

2. The method according to claim 1, wherein said separating is effected by at least one screen or trommel.

3. The method according to claim 2, wherein said trommel has a screen size of between about 300-500 mm.

4. The method according to claim 2, wherein said trommel has a screen size of between about 50-150 mm.

5. The method according to claim 1, wherein the separated fines have a diameter of less than about 200 mm.

6. The method according to claim 1, wherein following said pulping step b), at least a part of the pulped material is shredded.

7. The method according to claim 6, wherein said shredded material is re-pulped.

8. The method according to claim 1, wherein said pulping step b) results in obtaining at least three parts, comprising: (i) a pulp; (ii) other recyclables, and (iii) dirty wash water.

9. The method according to claim 8,
   wherein said other recyclables are removed from said pulped material before washing step c),
   wherein said other recyclables comprise plastic film and recyclable materials.

10. The method according to claim 1, wherein said washing step c) includes the use of at least one agent selected from the group consisting of surfactants, enzymes, catalysts, and additives.

11. The method according to claim 1, wherein said washing step c) further generates wash water which is optionally processed through biological treatment and recycled back into the main process and/or used for biogas production.

12. The method according to claim 1, wherein said fines are thermo-mechanically treated to allow breakdown of organic matter without the substantial shrinking of any plastics materials.

13. The method according to claim 12, wherein said thermo-mechanically treated fines undergo density separation to enable separation of (i) heavy particulate material; (ii) light particulate material; and (iii) organic matter.

14. The method according to claim 12, wherein said processing of said fines results in an organic-rich wash water.

15. The method according to claim 14, wherein said light particulate matter is fed back into washing step c).

* * * * *